United States Patent [19]
Grossman et al.

[11] Patent Number: 5,850,407
[45] Date of Patent: Dec. 15, 1998

[54] THIRD-HARMONIC GENERATOR WITH UNCOATED BREWSTER-CUT DISPERSIVE OUTPUT FACET

[75] Inventors: William M. Grossman, Los Altos; Jason D. Henrie, Santa Clara, both of Calif.

[73] Assignee: Lightwave Electronics Corporation, Mountain View, Calif.

[21] Appl. No.: 977,820

[22] Filed: Nov. 25, 1997

[51] Int. Cl.[6] ............................................ H01S 3/10
[52] U.S. Cl. ................................ 372/22; 372/21; 372/66; 372/92; 372/27; 372/108
[58] Field of Search ............................. 372/22, 21, 66, 372/92, 27, 108, 98

[56] References Cited

U.S. PATENT DOCUMENTS

| | | | |
|---|---|---|---|
| 3,873,825 | 3/1975 | Jones et al. | 250/199 |
| 4,510,402 | 4/1985 | Summers et al. | 307/427 |
| 5,034,951 | 7/1991 | Edelstein et al. | 372/22 |
| 5,047,668 | 9/1991 | Bosenberg | 359/330 |
| 5,052,780 | 10/1991 | Klein | 359/638 |
| 5,144,630 | 9/1992 | Lin | 372/22 |
| 5,237,578 | 8/1993 | Amano | 372/22 |
| 5,295,143 | 3/1994 | Rao et al. | 372/22 |
| 5,384,803 | 1/1995 | Lai | 372/100 |
| 5,408,481 | 4/1995 | Scheps | 372/22 |

OTHER PUBLICATIONS

Alfrey, A., *Intracavity Tripling of Diode–Pumped Nd:YVO4 at High Q–Switch Repetition Rates*, CLEO '96 Technical Digest, Postdeadline Paper Proceedings CPD19, Optical Society of America, Washington DC, 1996.

Colter;"Conversion from 3371 to 1124 A by nonresonant optical frequency tripling in compressed krypton gas";Optics Letters,vol 4 No. 5,May 1979.

Jones et al:"Milliwatt–Level 213nm Source Based on a Repetitively Q–Switched CW–Pum,ped Nd:YAG Laser"; IEEE Jour. of Quantum EWlectronics,vol QE–15,No 4,Apr. 1979.

Pixton; "Tripling YAG Frequency";Laser Focus,Jul. 1978, pp.66–70.

*Primary Examiner*—Leon Scott, Jr.
*Attorney, Agent, or Firm*—Lumen Intellectual Property Services

[57] ABSTRACT

A third-harmonic crystal has a Brewster-cut dispersive output surface for separating the p-polarized fundamental and third-harmonic beams without introducing losses into the beams. The output surface of the third-harmonic crystal is optically uncoated, and thus insensitive to potential ultraviolet (UV)-induced damage. Frequency doubling and tripling lithium triborate (LBO) crystals are used with a Brewster-cut Nd-YAG active medium in a resonant cavity to generate UV light at 355 nm from infrared (IR) light at 1064 nm. Except for the tripling crystal output surface, the doubling and tripling crystal optical surfaces are normal-cut and anti-reflection (AR) coated.

20 Claims, 1 Drawing Sheet

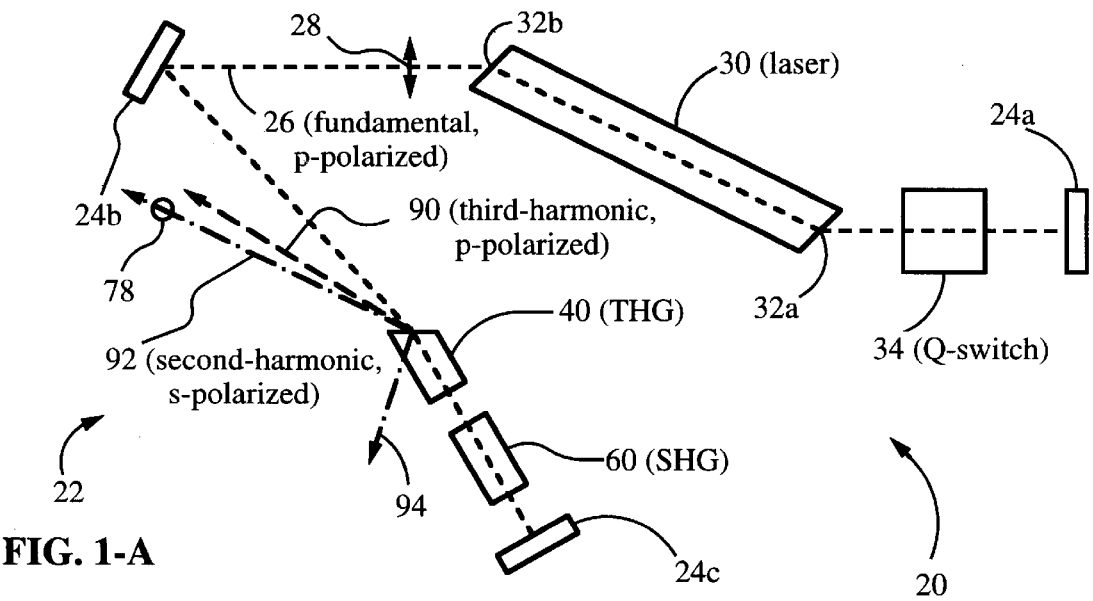
FIG. 1-A
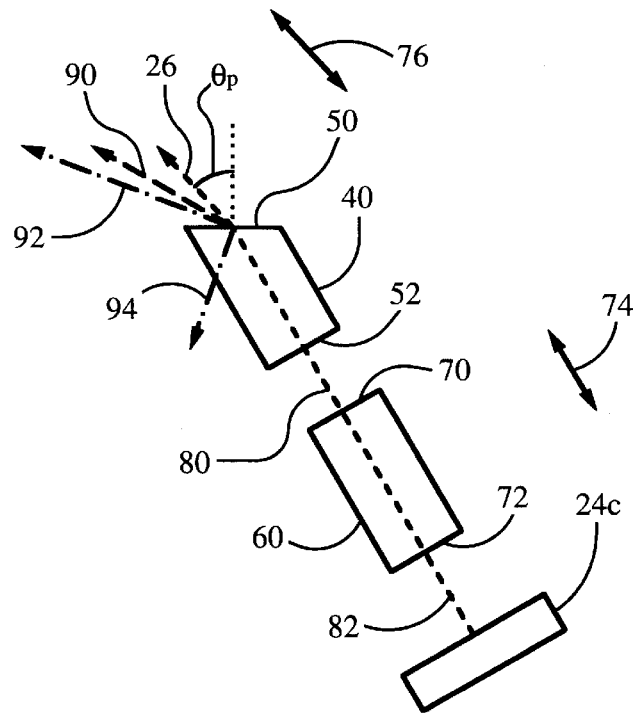
FIG. 1-B

ID OF THE INVENTION

The present invention relates to the field of optical frequency harmonic generators, and in particular to a third harmonic generator having an uncoated, dispersive Brewster's output facet for spatially separating the fundamental and third harmonic frequencies.

BACKGROUND OF THE INVENTION

The relative lack of availability of short-wavelength lasers has fueled much of the research effort to develop light sources based on frequency conversion. Light sources based on second and third-harmonic generation have been proposed for producing coherent ultraviolet (UV) light. For information on systems using frequency conversion see for example Chapter 10 and references therein of Koechner, *Solid State Laser Engineering*, fourth ed., Springer Series in Optical Sciences v. 1 (1996), as well as U.S. Pat. Nos. 5,408,481, 5,384,803, 5,295,143, 5,047,668, 5,034,951, 4,510,402, and 3,873,825.

In a conventional system based on third-harmonic generation, light of a fundamental ($\omega$) frequency is used in a non-linear crystal to produce light of a second-harmonic ($2\omega$) frequency. The second harmonic light is mixed with the fundamental light, typically in a different non-linear crystal, to produce light of a third-harmonic ($3\omega$) frequency. The third harmonic light (the useful output of the system) is then physically separated from the fundamental and second harmonic light using an intracavity or extracavity element such as a Brewster prism or a dichroic-coated mirror. Because of the relative inefficiencies of the two frequency-conversion steps, the intensity of the third-harmonic light is much lower than that of the fundamental light. Consequently, third-harmonic systems are extremely sensitive to optical losses, and in particular to losses to the fundamental light.

The second- and third-harmonic crystals are usually anti-reflection coated to prevent back reflections from the input and output surfaces of the crystals. Optical coatings are generally very sensitive to optical damage, however, and in particular to damage caused by short-wavelength light. An arrangement allowing the use of optically-uncoated crystal surfaces while simultaneously providing for wavelength separation and avoiding the back-reflection problem would be of great value in a light source based on third-harmonic generation. Such an arrangement would be particularly desirable for a system using intracavity frequency conversion element(s).

An article by Alfrey ("Intracavity Tripling of Diode-Pumped Nd:YVO$_4$ at High Q-Switch Repetition Rates," CLEO '96 Technical Digest, Postdeadline Paper Proceedings CPD19, Optical Society of America, Washington D.C., 1996) describes a third-harmonic system for generating ultraviolet (355 nm) light from infrared (1064 nm) light. Lithium triborate (LBO) crystals are used for frequency doubling and tripling in a resonant cavity containing a Nd-YVO$_4$ solid state laser. A Brewster-cut intracavity prism is used to extract the ultraviolet beam from the fundamental beam. For information on another prior art beam separator used for separating the second and third harmonic beams from the fundamental beam see U.S. Pat. No. 5,052,780.

The intracavity prism results in reduced losses relative to beam separation schemes using dichroic mirrors. The intracavity prism increases the complexity of the system, however. In addition, the intracavity prism does not alleviate the need for anti-reflection coating the output surface of the frequency-tripling crystal in order to minimize losses to the fundamental and third-harmonic light beams. Leaving the output surface uncoated in the Alfrey system would result in high losses to the fundamental light. At the same time, the use of an AR coating for the output surface severely limits the useful lifetime of the Alfrey system, due to UV-induced damage to the AR coating.

OBJECTS AND ADVANTAGES OF THE INVENTION

It is a primary object of this invention to provide a third-harmonic system allowing the use of an optically uncoated output surface for the frequency-tripling crystal, while maintaining losses to the fundamental and third-harmonic light beams to a minimum. It is another object to provide a third-harmonic system allowing separation of the fundamental and third-harmonic light beams without the use of separate dispersive optical elements (e.g. prisms or dichroic mirrors) not required for frequency-conversion.

SUMMARY OF THE INVENTION

An optical system for third harmonic generation comprises an active medium, a second harmonic generator (SHG), and a third harmonic generator (THG) situated in a resonant cavity. The resonant cavity is capable of supporting light of a fundamental frequency generated by the active medium. The SHG produces light of a second harmonic frequency from light of the fundamental frequency. The THG produces light of a third harmonic frequency from light of the fundamental frequency and light of the second harmonic frequency. The THG has a dispersive output facet for emitting the third harmonic light and separating the third harmonic light from the fundamental light. The fundamental light and third harmonic light are preferably p-polarized with respect to the THG output facet; in one embodiment, the second-harmonic light is s-polarized with respect to the THG output facet. The output facet is preferably oriented at Brewster's angle with respect to the fundamental and third harmonic light, such that the output facet does not substantially impede the passage of fundamental or third harmonic light. In addition, the output facet impedes the passage of any s-polarized component of light, thus acting as a polarization-selective element. The output facet is uncoated for antireflection at the fundamental frequency, and thus has a reduced susceptibility to optical damage caused by third harmonic light. The output facet is preferably uncoated, and is resistant to damage caused by third harmonic light.

The THG is situated between the active medium and the SHG such that the THG output facet faces the active medium while its input facet faces the SHG. A pulsing device such as a Q-switch situated within the cavity generates high-intensity light pulses of the fundamental frequency, improving the conversion efficiency of the SHG and THG. In addition to the THG output facet, a polarization-selective element within the cavity selects p-polarized light of the fundamental frequency.

DESCRIPTION OF THE FIGURES

FIG. 1-A is schematic diagram illustrating a preferred system of the present invention.

FIG. 1-B shows a detail of FIG. 1-A, including second- and third-harmonic generators and corresponding second- and third-harmonic light beams, according to the present invention.

DETAILED DESCRIPTION

In the following discussion, unless indicated otherwise, the terms "p-polarized" and "s-polarized" will be used with respect to an output surface 50 of a third harmonic generator 40.

FIG. 1-A is a schematic diagram of a third-harmonic optical system 20 of the present invention, while FIG. 1-B is a detail showing the frequency-conversion part of system 20. System 20 comprises a resonant cavity 22 defined by mirrors 24a–c. Cavity 22 is suitable for supporting a light beam 26 of a fundamental frequency generated by an active medium 30 situated within cavity 22. The dimensions (e.g. radii), reflectivities and spacings of mirrors 24a–c are chosen such that cavity 22 is a resonator capable of supporting light of the fundamental frequency. In one embodiment, active medium 30 is a 0.063'×63 mm Nd-YAG Brewster rod having a 1% dopant level. Other suitable active media include end-pumped or side-pumped solid, liquid, and gaseous media such as Nd:YAG, Nd:YLF, Nd:YVO$_4$, Nd:YALO, Ruby Titanium Sapphire, CrLiSAF, Ar-ion, Kr-ion, and dye media of various shapes and sizes. The active medium is preferably capable of generating high-intensity light pulses under the control of a pulsing means (e.g. a Q-switch or a gain control device).

The fundamental frequency is preferably an infrared frequency corresponding to a wavelength of 1064 nm. Mirrors 24a–c have high reflectivities (>99.9) for light at 1064 nm. Mirror 24c also has a high reflectivity for light at 532 nm (second harmonic). The third harmonic wavelength is preferably 355 nm. Generally, the fundamental wavelength is chosen so as to generate some desired third harmonic wavelength. The third harmonic wavelengths of most practical interest are between 190 nm in the UV and 450 nm in the visible (blue).

Active medium 30 has two end Brewster surfaces 32a–b through which fundamental light beam 26 passes. Surfaces 32a–b are situated at a Brewster's angle relative to beam 26, such that beam 26 is p-polarized with respect to surfaces 32a–b, i.e. polarized in the plane of the beam and the normal to surfaces 32a–b. Beam 26 is also p-polarized with respect to output surface 50, as explained below. The polarization of beam 26 is parallel to the page in FIG. 1-A, and is illustrated by the arrow 28. A polarization selection device separate from the active medium can be used in addition to surfaces 32a–b and surface 50 for selecting linearly-polarized fundamental light (of some desired polarization orientation) for propagation within cavity 22.

A Q-switch 34 is situated in an optical path between active medium 26 and mirror 24a. Q-switch 34 is used to generate high-intensity pulses of fundamental-frequency light within cavity 22. The pulse frequency is generally between <1 kHz and 100 kHz, preferably between 1 kHz and 10 kHz. Q-switch 34 is preferably an acousto-optic modulator (AOM). Other suitable Q-switches include electro-optic modulators or mechanical devices, as is apparent to the skilled artisan. A gain control device directly coupled to the active medium may be used instead of Q-switch 34 to generate high-intensity light pulses. A modelocker can be used instead of Q-switch 34 to enhance the peak intensity of the pulses generated by system 20.

A third-harmonic generator (THG) 40 is situated within resonant cavity 22, between active medium 30 and mirror 24c. THG 40 is preferably a lithium triborate (LBO) crystal. A second harmonic generator (SHG) 60 is situated within resonant cavity 22, between THG 40 and mirror 24c. Second harmonic generator 60 is preferably also a LBO crystal. As is apparent to the skilled artisan, the crystal axes of THG 40 and SHG 60 are oriented differently with respect to the direction of light propagation within THG 40 and SHG 60, according to the respective functions of THG 40 and SHG 60. Generally, various other structures can be used for the SHG and THG, including LiNbO$_3$, KDP (and isomorphs), or LiIO$_3$ crystals, as well as quasi-phase-matched materials such as periodically-poled lithium tantalate. In a quasi-phase-matched material, the fundamental and higher harmonic light can have identical polarizations.

As shown in FIG. 1-B, THG 40 has an output facet 50 facing active medium 30, and an input facet 52 opposite output facet 50, facing SHG 60. SHG 60 has opposite facets 70 and 72 facing THG 40 and mirror 24c, respectively. Facets 70 and 72 serve as both input and output facets, as explained below. Facets 70 and 72 are normal-cut (or near-normal), and normal (or near-normal) to the direction of light passing through SHG 60 and THG 40 (illustrated by arrow 74). Facets 70 and 72 are anti-reflection (AR) coated for light at 1064 nm and 532 nm. Anti-reflection coatings for given wavelength ranges are well known in the art. Input facet 52 of THG 40 is also near-normal-cut, normal to the direction of light propagation through THG 40, and AR-coated for 1064 nm and 532 nm.

It is critical that output facet 50 be cut at an oblique angle to direction 74 and to the direction of fundamental light propagation between THG 40 and mirror 24b (illustrated by arrow 76). Arrow 76 and 74 are parallel to beams 26 and 82, respectively, and are not mutually parallel. Preferably, output facet 50 is Brewster-cut such that output facet 50 does not impede the passage of fundamental and third-harmonic p-polarized light. The angle between the normal to output facet 50 and direction 76 is given approximately by Brewster's angle $$\theta_p = \text{Arctan}\left(\frac{n_2}{n_1}\right) \quad [1]$$

wherein $n_2$ and $n_1$ are the indices of refraction of THG 40 and air, respectively. As is apparent to the skilled artisan, the index of refraction of THG 40 can vary with wavelength, and consequently Brewster's angle can vary somewhat with wavelength. The orientation of facet 50 is chosen so as to satisfy Brewster's condition for the fundamental light direction 76, since the third harmonic output intensity is most sensitive to losses introduced at the fundamental frequency. Brewster's angles for the fundamental and third harmonic are substantially identical for commonly used materials and wavelengths. Brewster's angles for 355 nm and 1064 nm p-polarized light differ by about 0.65° in LBO THG 40, which corresponds to a ~0.1% loss in the output power of the third harmonic due to the non-ideal Brewster-matching for the third harmonic.

Output facet 50 is preferably optically uncoated, in particular uncoated for antireflection at the fundamental frequency, such that output facet 50 is resistant to damage caused by third harmonic light. Output facet 50 can have a mechanically and optically robust coating, but lacks the anti-reflection coating(s) conventionally used in third-harmonic generation systems. In particular, output facet 50 need not have, and preferably does not have, optical coatings for preventing reflections of light at the fundamental or third harmonic wavelengths. The absence of optical coatings makes output facet 50 relatively insensitive to optical damage, and in particular to damage caused by third-harmonic (UV) light. Many commercial applications require essentially damage-free (<0.1% damage-induced losses) operation for thousands of hours, preferably >10,000 hours, at high power levels (total powers on the order of watts, corresponding to local power densities on the order of $10^7$ to $10^8$ W/cm$^2$ for a spot size of 150 $\mu$m). Prior-art AR-coated THG systems can show significant UV-induced damage anywhere from instantaneously to within tens of hours of operation at typical UV power levels. UV-induced damage to coatings has been one of the major obstacles facing practical, reliable implementations of THG systems.

Fundamental, p-polarized light generated by active medium 30 is incident on facet 70 of SHG 60. SHG 60 generates s-polarized second harmonic light at 532 nm, which extends from output facet 72, is reflected by mirror 24c, and is incident on input facet 52 of THG 40. The polarization direction of the s-polarized light is perpendicular to the plane defined by the normal to output facet 50 and direction 74 (perpendicular to the page in FIG. 1-B, as illustrated by the mark 78). Additional second harmonic light is generated by SHG 60 from fundamental light reflected by mirror 24c and incident on facet 72. The beam section 80 between THG 40 and SHG 60 comprises fundamental light traveling in both directions, as well as second harmonic light traveling from SHG 60 to THG 40. The beam section 82 between SHG 60 and mirror 24c comprises both fundamental and second-harmonic light traveling in both directions. Fundamental and second harmonic light are incident on input facet 52 of THG 40.

THG 40 generates p-polarized third harmonic light at 355 nm, by mixing the fundamental and second harmonic light incident on input facet 52. A third harmonic light beam 90 exits THG 40 through output facet 52, as does a second harmonic light beam 92 and fundamental light 26. Since the second harmonic light is s-polarized, some of the second harmonic light is back reflected by output facet 52 to form beam 94. The spread in the deflections of all beams in the representation of FIG. 1-B is exaggerated for clarity.

Since output facet 50 is not normal to the directions of light propagation inside and outside THG 40, output facet 50 serves as a dispersive surface, spatially separating the third harmonic, second harmonic, and fundamental frequency light according to the indices of the refraction of SHG 40 for each respective wavelength and polarization direction. Thus, a separate dispersive element such as the Brewster prism used by Alfrey is not needed in the present invention. Moreover, since output facet 50 is approximately at a Brewster's angle relative to the direction of light propagation of the p-polarized fundamental and third harmonic light, output facet 50 does not substantially impede the passage of fundamental and third harmonic light. Consequently, anti-reflection coatings prone to UV-induced damage need not be used for output facet 50, without loss of cavity finesse for fundamental light or useful output at the third harmonic frequency. While some second-harmonic light can be lost by back-reflection at output facet 50, the useful output of system 20 is third harmonic beam 90, which is unaffected by output facet 50.

Because of its oblique orientation, output facet 50 alters the cross-section of passing light. For example, the cross-section of a beam can change from circular to elliptical or vice-versa after passage through output facet 50. As is apparent to the skilled artisan, intracavity or extracavity beam shaping elements can be used to attain a desired beam cross-section at particular intracavity or extracavity locations.

All publications cited above are herein incorporated by reference for all purposes, to the same extent as if each individual publication was individually indicated to be so incorporated by reference.

It will be clear to one skilled in the art that the above embodiment may be altered in many ways without departing from the scope of the invention. For example, the resonant cavity need not be linear or folded—ring cavities can be used. The positions or orientations of the THG and SHG relative to each other and relative to the active medium may be altered. Auxiliary polarization-control devices can be used in addition to or instead of active medium Brewster surfaces for controlling the polarization characteristics of intracavity light. Single-mode or multi-transverse- or multi-longitudinal-mode operation can be used. A Q-switch or modelocker is not required. Multiple intracavity or extra-cavity polarization-selective elements such as Brewster plates or dichroic mirrors can be used. A polarization-selective element is not absolutely required. Accordingly, the scope of the invention should be determined by the following claims and their legal equivalents.

What is claimed is:

1. An optical system comprising:
   a) a resonant cavity capable of supporting light of a fundamental frequency;
   b) a second harmonic generator situated within said resonant cavity, for producing light of a second harmonic frequency from said light of said fundamental frequency; and
   c) a third harmonic generator situated within said resonant cavity and in optical communication with said second harmonic generator, for producing light of a third harmonic frequency from said light of said second harmonic frequency and said light of said fundamental frequency, wherein:
      said third harmonic generator has an output facet for emitting light of said third harmonic frequency generated by said third harmonic generator, and for spatially separating said light of said third harmonic frequency from said light of said fundamental frequency, and
      said output facet is situated substantially at a Brewster's angle with respect to said light of said fundamental frequency and said light of said third harmonic frequency, such that said output facet transmits substantially all p-polarized light of said fundamental frequency and said third harmonic frequency.

2. The system of claim 1 wherein said output facet is substantially uncoated for anti-reflection at said fundamental frequency, whereby said output facet has a reduced susceptibility to optical damage caused by said light of said third harmonic frequency.

3. The system of claim 1 wherein said output facet is substantially uncoated.

4. The system of claim 1 wherein said output facet is resistant to optical damage caused by said light of said third harmonic frequency.

5. The system of claim 1 further comprising an active medium situated within said resonant cavity, for generating said light of said fundamental frequency.

6. The system of claim 5 wherein said third harmonic generator is situated in an optical path between said active medium and said second harmonic generator such that said input facet faces said second harmonic generator and said output facet faces said active medium.

7. The system of claim 5 further comprising a Q-switch situated within said resonant cavity, for generating light pulses of said fundamental frequency.

8. The system of claim 1 further comprising a polarization-selective element situated within said cavity, for selecting p-polarized light of said fundamental frequency for passage to said third harmonic generator.

9. The system of claim 1 wherein said third harmonic generator comprises a lithium triborate crystal.

10. The system of claim 1 wherein a fundamental wavelength corresponding to said fundamental frequency is substantially 1064 nm, and a third harmonic wavelength corresponding to said third harmonic frequency is substantially 355 nm.

11. An optical system comprising:
   a) a resonant cavity capable of supporting light of a fundamental frequency; and
   b) a third harmonic generator situated within said resonant cavity, for producing light of a third harmonic frequency from said light of said fundamental frequency, said third harmonic generator having a dispersive output facet for spatially separating said light of said third harmonic frequency from said light of said fundamental frequency.

12. The system of claim 11 wherein said output facet is situated substantially at a Brewster's angle with respect to said light of said fundamental frequency and said light of said third harmonic frequency, such that said output facet transmits substantially all p-polarized light of said fundamental frequency and said third harmonic frequency.

13. A third harmonic generator having a normal-cut input facet for receiving p-polarized light of a fundamental frequency, and a Brewster-cut dispersive output facet opposite said input facet for emitting p-polarized light of a third harmonic frequency and for separating said light of said third harmonic frequency from said light of said fundamental frequency without substantially impeding said light of said fundamental frequency.

14. The third harmonic generator of claim 13 wherein said output facet is resistant to damage caused by said light of said third harmonic frequency.

15. An optical system for third harmonic generation, comprising:
   a) a resonant cavity capable of supporting light of a fundamental frequency;
   b) an active medium situated within said cavity, for generating p-polarized light of said fundamental frequency;
   c) a second harmonic generator situated within said resonant cavity, for generating s-polarized light of a second harmonic frequency from said light of said fundamental frequency; and
   d) a third harmonic generator situated within said resonant cavity, for generating p-polarized light of a third harmonic frequency from said light of said second harmonic frequency and said light of said fundamental frequency, said third harmonic generator having:
      a normal-cut input facet facing said second harmonic generator, for receiving said light of said second harmonic frequency;
      a Brewster-cut dispersive output facet facing said active medium, for emitting light of said third harmonic frequency generated by said third harmonic generator without impeding said light of said fundamental frequency, and for spatially separating said light of said third harmonic frequency from said light of said fundamental frequency.

16. A method of generating light of a third harmonic frequency, comprising the steps of:
   a) establishing light of a fundamental frequency within a resonant cavity capable of supporting said light of said fundamental frequency;
   b) generating light of a third harmonic frequency from said light of said fundamental frequency using a third harmonic generator; and
   c) spatially separating said light of said third harmonic frequency from said light of said fundamental frequency at a dispersive output facet of said third harmonic generator.

17. The method of claim 16 wherein said output facet is situated substantially at a Brewster's angle with respect to said light of said fundamental frequency and said light of said third harmonic frequency, such that said output facet transmits substantially all p-polarized light of said fundamental frequency and said third harmonic frequency.

18. The method of claim 16 wherein said output facet is substantially uncoated.

19. The method of claim 16 wherein said output facet is resistant to optical damage caused by said light of said third harmonic frequency.

20. The method of claim 16 further comprising a step of selecting p-polarized light of said fundamental frequency for transmission in said resonant cavity.

* * * * *